(12) United States Patent
Kochi et al.

(10) Patent No.: US 11,776,343 B2
(45) Date of Patent: *Oct. 3, 2023

(54) FACE AUTHENTICATION APPARATUS

(71) Applicant: NEC Corporation, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,921

(22) Filed: Feb. 16, 2022

(65) Prior Publication Data

US 2022/0172543 A1    Jun. 2, 2022

Related U.S. Application Data

(63) Continuation of application No. 16/961,561, filed as application No. PCT/JP2018/047066 on Dec. 20, 2018.

(30) Foreign Application Priority Data

Jan. 12, 2018  (JP) ................. 2018-003233

(51) Int. Cl.
*G07C 9/37* (2020.01)
*G06F 21/32* (2013.01)
*G06V 40/16* (2022.01)

(52) U.S. Cl.
CPC .............. *G07C 9/37* (2020.01); *G06F 21/32* (2013.01); *G06V 40/172* (2022.01); *G07C 2209/08* (2013.01)

(58) Field of Classification Search
CPC .. G06K 9/00288; G06K 9/00268; G07C 9/10; G07C 2209/08; G07C 9/37;
(Continued)

(56) References Cited

U.S. PATENT DOCUMENTS

| 2004/0117638 A1 | 6/2004 | Monroe | |
| 2005/0205668 A1* | 9/2005 | Sogo | ................. G07C 9/257 235/382 |

(Continued)

FOREIGN PATENT DOCUMENTS

| EP | 1835431 A1 | 9/2007 |
| JP | 2002-183734 A | 6/2002 |

(Continued)

OTHER PUBLICATIONS

Office Action for corresponding JP 2018-003233, dated Feb. 5, 2019.
(Continued)

*Primary Examiner* — Ruiping Li

(57) ABSTRACT

A face authentication apparatus includes a face image acquisition unit, a collation unit, a time measurement unit, and a threshold change unit. The face image acquisition unit acquires a face image of an authentication target. The collation unit performs face authentication on the face image of the authentication target on the basis of a threshold. The time measurement unit measures the elapsed time from the time of starting operation of the face authentication apparatus. The threshold change unit restricts changing of the threshold to a value larger than a value determined depending on the measured elapsed time.

19 Claims, 9 Drawing Sheets

(58) Field of Classification Search
CPC .. G06T 7/62; G06T 7/70; G06F 21/32; G06V 40/172
See application file for complete search history.

(56) References Cited

U.S. PATENT DOCUMENTS

| | | | |
|---|---|---|---|
| 2007/0150745 A1 | 6/2007 | Peirce et al. | |
| 2008/0317294 A1* | 12/2008 | Hashimoto | G07C 9/37 382/115 |
| 2014/0129487 A1 | 5/2014 | Adachi | G07F 17/3251 706/11 |
| 2016/0063235 A1 | 3/2016 | Tussy | G06K 9/22 726/6 |
| 2018/0047274 A1* | 2/2018 | Miwa | G08B 13/19613 |

FOREIGN PATENT DOCUMENTS

| | | |
|---|---|---|
| JP | 2009-003659 A | 1/2009 |
| JP | 2010-003009 A | 1/2010 |
| JP | 2013-117876 A | 6/2013 |
| JP | 2016-051482 A | 4/2016 |
| JP | 2016-118977 A | 6/2016 |

OTHER PUBLICATIONS

Decision to Grant a Patent for corresponding JP 2018-003233, dated Apr. 9, 2019.
International Search Report for PCT/JP2018/047066, dated Feb. 12, 2019.
Extended European Search Report for EP Application No. EP18899415.6 dated Feb. 10, 2021.
U.S. Office Action for U.S. Appl. No. 17/672,855 dated Jan. 18, 2023.

* cited by examiner

FIG. 3

| STAGE NO. | PERIOD | COLLATION THRESHOLD VALUE |
|---|---|---|
| 1 | $t \leq T1$ | TH1 |
| 2 | $T1 < t \leq T2$ | TH2 |
| 3 | $T2 < t \leq T3$ | TH3 |
| 4 | $T3 < t$ | TH4 |

| SCHEDULE NO. | 1 | |
|---|---|---|
| SELECTION CONDITION | A < AVERAGE VALUE OF SIMILARITY ON FACE AUTHENTICATION SUCCESS ≦ B | |
| STAGE NO. | PERIOD | COLLATION THRESHOLD VALUE |
| 1 | t≦T1 | TH1 |
| 2 | T1<t≦T2 | TH2 |
| 3 | T2<t≦T3 | TH3 |
| 4 | T3<t | TH4 |

125-2

| SCHEDULE NO. | 2 | |
|---|---|---|
| SELECTION CONDITION | AVERAGE VALUE OF SIMILARITY ON FACE AUTHENTICATION SUCCESS > B | |
| STAGE NO. | PERIOD | COLLATION THRESHOLD VALUE |
| 1 | t≦T1 | TH1 |
| 2 | T1<t≦T2 | (TH2+TH3)/2 |
| 3 | T2<t | TH4 |

125-3

| SCHEDULE NO. | 3 | |
|---|---|---|
| SELECTION CONDITION | AVERAGE VALUE OF SIMILARITY ON FACE AUTHENTICATION SUCCESS ≦ A | |
| STAGE NO. | PERIOD | COLLATION THRESHOLD VALUE |
| 1 | t≦T1 | TH1 |
| 2 | T1<t≦(T1+T2)/2 | (TH1+TH2)/2 |
| 3 | (T1+T2)/2<t≦T2 | TH2 |
| 4 | T2<t≦(T2+T3)/2 | (TH2+TH3)/2 |
| 5 | (T2+T3)/2<t≦T3 | TH3 |
| 6 | T3<t≦T4 | (TH3+TH4)/2 |
| 7 | T4<t | TH4 |

FACE AUTHENTICATION APPARATUS

CROSS-REFERENCE TO RELATED APPLICATIONS

The present application is a continuation application of U.S. patent application Ser. No. 16/961,561 filed on Jul. 10, 2020, which is a National Stage Entry of international application PCT/JP2018/047066, filed Dec. 20, 2018, which claims the benefit of priority from Japanese Patent Application 2018-003233 filed on Jan. 12, 2018, the disclosures of all of which are incorporated in their entirety by reference herein.

TECHNICAL FIELD

The present invention relates to a face authentication apparatus, a face authentication method, and a recording medium.

BACKGROUND ART

Conventionally, in various systems such as an access monitoring system and an attendance management system, personal authentication by means of face authentication is performed on a user who passes through a gate or the like.

For example, Patent Literatures 1 to 3 disclose a face authentication apparatus that performs personal authentication by acquiring a face image of an authentication target by a camera, calculating similarity between the face image of the authentication target and a reference face image of a person that is previously registered, and comparing it with a threshold, thereby collating the face image of the authentication target and the reference face image.

Further, a face authentication apparatus of this type employs a configuration of automatically changing a threshold to be used for collation.

For example, in Patent Literature 1, a threshold is determined based on the false rejection rate. In Patent Literature 2, a threshold is changed based on an authentication result after the start of operation. In Patent Literature 3, a threshold is changed according to a used condition such as a period of time in which the frequency of use is high.

Patent Literature 1: JP 2016-118977 A
Patent Literature 2: JP 2013-117876 A
Patent Literature 3: JP 2002-183734 A

SUMMARY

At the time of starting operation of a face authentication apparatus, since a user is not used to use it, there is a tendency that a high-quality face image cannot be obtained. For example, when a face authentication apparatus is provided to an existing or new gate and face authentication is performed on users who pass through the gate, a user may look down when passing through the gate or a user may attempt to pass through the gate with a mask so that a part of the face is hidden, in the beginning of the operation. As a result, the quality of a face image tends to be lowered. On the other hand, when a certain period of time has passed from the start of operation, users are used to use face authentication. Therefore, acts of lowering the quality of a face image as described above are decreased. However, Patent Literatures 1 to 3 do not pay attention to such acts of users as described above. Therefore, there is a case where a large threshold value that can achieve target security strength is set from the beginning of the operation so that the frequency of failure in face authentication is high. There is also a case where although a small threshold value is set at the beginning of the operation, the threshold value may be incremented easily so that the frequency of failure in face authentication becomes high. As a result, convenience of a face authentication apparatus in the beginning of the operation is lowered.

An exemplary object of the present invention is to provide a face authentication apparatus that solves the aforementioned problem.

A face authentication apparatus according to one aspect of the present invention is a face authentication apparatus including a face image acquisition unit that acquires a face image of an authentication target, a collation unit that performs face authentication on the face image of the authentication target on the basis of a threshold, a time measurement unit that measures elapsed time from the time of starting operation of the face authentication apparatus, and a threshold change unit that restricts changing of the threshold to a value larger than a value determined depending on the elapsed time measured.

A face authentication method according to another aspect of the present invention is a face authentication method performed by a face authentication apparatus. The method includes acquiring a face image of an authentication target, performing face authentication on the face image of the authentication target on the basis of a threshold, measuring elapsed time from the time of starting operation of the face authentication apparatus, and restricting changing of the threshold to a value larger than a value determined depending on the elapsed time measured.

A computer-readable medium according to another aspect of the present invention stores a program for causing a computer constituting a face authentication apparatus to function as a face image acquisition unit that acquires a face image of an authentication target, a collation unit that performs face authentication on the face image of the authentication target on the basis of a threshold, a time measurement unit that measures elapsed time from the time of starting operation of the face authentication apparatus, and a threshold change unit that restrict changing of the threshold to a value larger than a value determined depending on the elapsed time measured.

With the configurations described above, the present invention is able to prevent deterioration in convenience of a face authentication apparatus in the beginning of operation.

BRIEF DESCRIPTION OF DRAWINGS

FIG. 3 illustrates an example of a threshold changing schedule in the face authentication apparatus according to the first exemplary embodiment of the present invention.

FIG. 8 illustrates examples of threshold changing schedules in a face authentication apparatus according to a second exemplary embodiment of the present invention.

EXEMPLARY EMBODIMENTS

Next, exemplary embodiments of the present invention will be described in detail with reference to the drawings.

First Exemplary Embodiment

Figure 1:
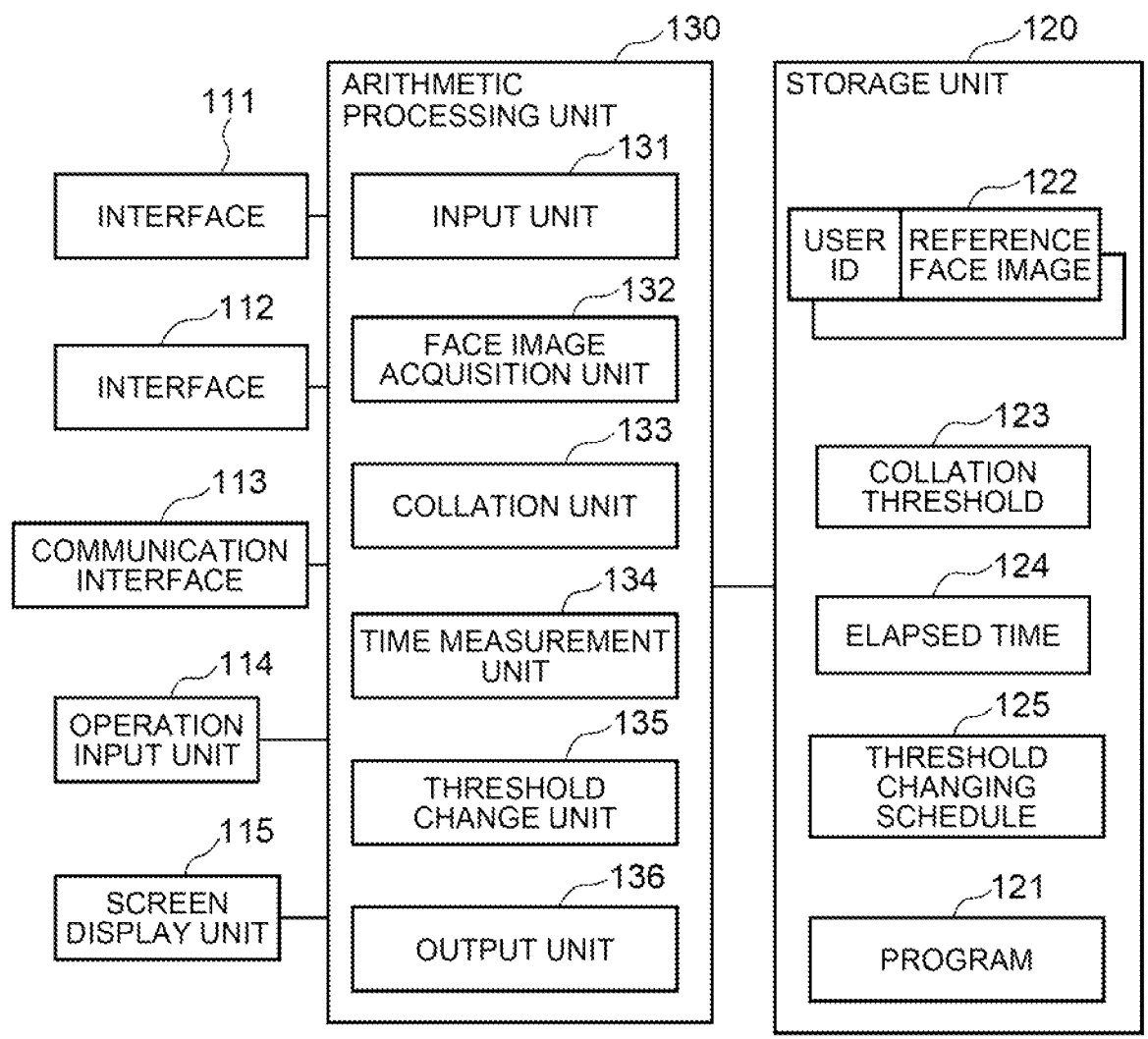
FIG. 1 is a block diagram of a face authentication apparatus according to a first exemplary embodiment of the present invention.
Figure 2:
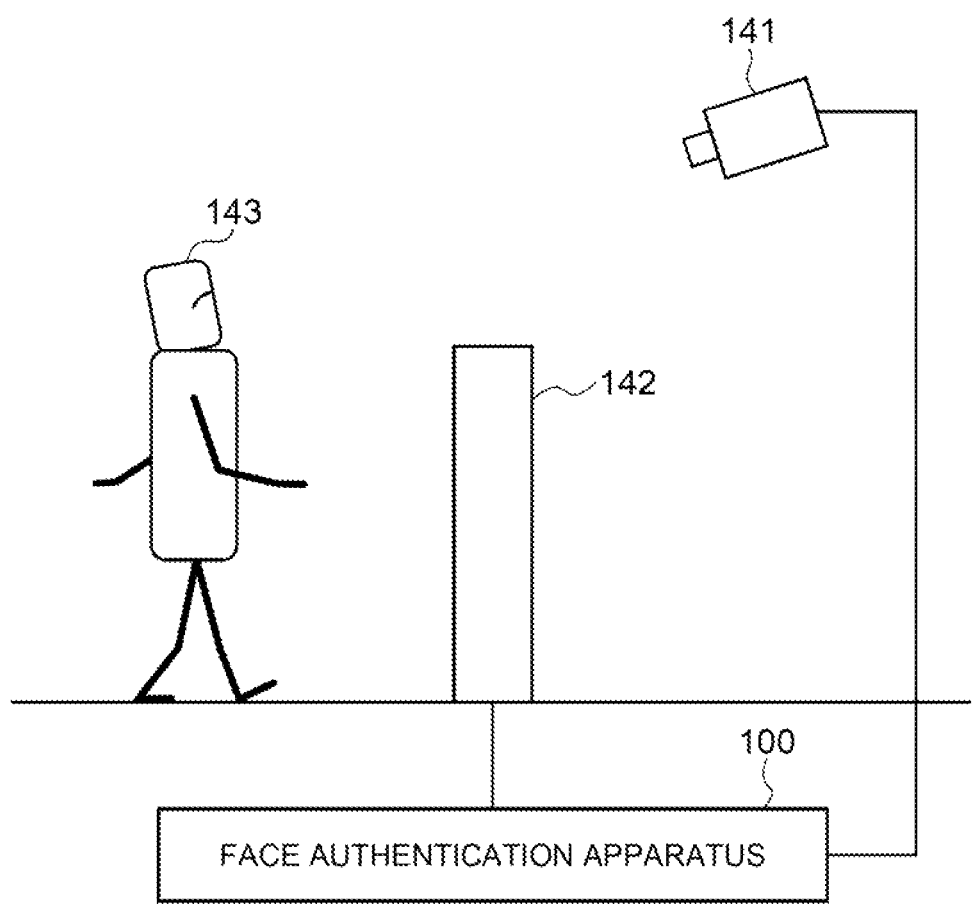
FIG. 2 is a schematic diagram of an access management system including the face authentication apparatus according to the first exemplary embodiment of the present invention.

FIG. 1 is a block diagram of a face authentication apparatus 100 according to a first exemplary embodiment of the present invention. FIG. 2 is a schematic diagram of an access management system including the face authentication apparatus 100 according to the present embodiment. Referring to FIG. 1, the face authentication apparatus 100 of the present embodiment includes an interface 111 with a camera unit 141, an interface 112 with a gate apparatus 142, a communication interface 113, an operation input unit 114, a screen display unit 115, a storage unit 120, and an arithmetic processing unit 130.

The interface 111 is configured to transmit and receive signals with the camera unit 141 that images a face of a person who is an authentication target. Transmission and reception of signals may be performed via wired or wireless communication. As illustrated in FIG. 2, the camera unit 141 is set at a position with an image angle where the camera unit 141 can image a face portion of a user 143 who passes through the gate apparatus 142. The camera unit 141 is an imaging device configured of a Charge Coupled Device (CCD), a Complementary Metal-Oxide Semiconductor (CMOS) device, or the like that outputs image data captured by imaging a face of a person who is a collation target to the arithmetic processing unit 130 via the interface 111. The image data captured by the camera unit 141 is, for example, a black-and-white gradation image of 256 gradations but may be a color image.

The interface 112 is configured to transmit and receive signals such as results of face authentication to and from the gate apparatus 142. Transmission and reception of signals may be performed via wired or wireless communication. The gate apparatus 142 performs predetermined operation according to the received result of the face authentication. Predetermined operation may include various types of operation. For example, the gate apparatus 142 automatically performs open/close operation of a door attached to the gate apparatus 142 according to the result of face authentication. The gate apparatus 142 may include a gate bar that is manually openable/closable, and release lock of the gate bar for a certain period only when face authentication has succeeded. The gate apparatus 142 may output a message of passage propriety visually or by sound from an alarm provided to the gate apparatus 142 according to the result of face authentication. The gate apparatus 142 may be a stationary type, or a portable type that can be moved. The gate apparatus 142 may be an apparatus independent of the face authentication apparatus 100, or an apparatus integrated with the face authentication apparatus 100.

The communication interface 113 is a communication device that performs data communication with an external device such as a terminal. The communication system may be wired or wireless communication.

The operation input unit 114 includes an input device such as a keyboard and numeric keys, and is configured to detect an operation by an operator and output it to the arithmetic processing unit 130.

The screen display unit 115 is a screen display device such as a liquid crystal display (LCD) or a plasma display panel (PDP). The screen display unit 115 is configured to display various types of information such as an authentication result on a screen according to an instruction from the arithmetic processing unit 130.

The storage unit 120 is a storage device such as a hard disk or a memory. The storage unit 120 is configured to store therein processing information and a program 121 necessary for various types of processing to be performed in the arithmetic processing unit 130.

The program 121 implements various processing units by being read into the arithmetic processing unit 130 and executed. The program 121 is read, in advance, from an external device (not illustrated) or a storage medium (not illustrated) via a data input/output function such as the communication interface 113, and is stored in the storage unit 120.

Main processing information stored in the storage unit 120 includes reference face image data 122, a collation threshold 123, elapsed time 124, and a threshold changing schedule 125.

The reference face image data 122 is data in which a face image, serving as a reference to be used when face authentication is performed, and a user ID are associated with each other. In the reference face image data 122, at least one face image of a person having a user ID may be associated with the user ID as a reference face image. Alternatively, in the reference face image data 122, the feature amount of a face extracted from a face image of a person having a user ID may be associated with the user ID as reference face information. Here, the feature amount of a face is a numerical value representing a feature of each part in a face image for recognizing the positional relationship or shape of each part such as eye, nose, mouth, eyebrow, or the like constituting the face, and is used for similarity determination or the like between images.

The collation threshold 123 is a threshold to be used for performing face authentication. In the case of the present embodiment, the collation threshold 123 is shared by every user ID.

The elapsed time 124 is data showing elapsed time from the start of operation of the face authentication apparatus 100.

The threshold changing schedule 125 is data showing a schedule of changing the collation threshold 123. In the threshold changing schedule 125, values of the collation threshold at the time of starting operation of the face authentication apparatus 100 and values of the collation threshold after the change to be used at a plurality of points of time after the start of operation are defined. Further, in the threshold changing schedule 125, the value of the collation threshold after the change is larger as the elapsed time from the start of operation of the face authentication apparatus 100 is longer.

FIG. 3 shows an example of the threshold changing schedule 125. The threshold changing schedule 125 of this example includes a plurality of rows, each of which is configured of stage No., period, and collation threshold value. The stage No. is a number of identifying each state when a section from a point of time of starting operation until a point of time of setting the collation threshold to be a target value is divided into a plurality of stages. The period is time information defining the section of the stage. The collation threshold value is a value of the collation threshold used in the stage. For example, the stage of the stage No. 1 is a period in which the operation start time is the start and a point of time at which time T1 elapses is the end, and the collation threshold value is TH1. The stage of the stage No. 2 is a period in which the point of time at which time T1 elapses from the start of operation is the start and the point of time at which time T2 elapses from the start of operation is the end, and the collation threshold value is TH2. The stage of the stage No. 3 is a period in which the point of time at which time T2 elapses from the start of operation is the start and the point of time at which time T3 elapses from the start of operation is the end, and the collation threshold value is TH3. The stage of the stage No. 4 is a period in which the point of time at which time T3 elapses from the start of operation is the start, and the collation threshold value is TH4. Here, TH1<TH2<TH3<TH4 is established. TH1 is also referred to as an initial value of the collation threshold, TH4 is also referred to as a target value, and TH2 and TH3 are also referred to as intermediate values of the collation threshold. While the threshold changing schedule 125 is configured of four stages in this example, any number of stages is acceptable if it is plural.

The arithmetic processing unit 130 is an arithmetic processing unit having a microprocessor such as an MPU and its peripheral circuits. The arithmetic processing unit 130 is configured to read the program 121 from the storage unit 120 and executes it to thereby allow the hardware and the program 121 to operate in cooperation with each other to implement various processing units. The processing units implemented by the arithmetic processing unit 130 includes the input unit 131, the face image acquisition unit 132, the collation unit 133, the time measurement unit 134, the threshold change unit 135, and the output unit 136.

The input unit 131 is configured to receive the reference face image data 122 and the threshold changing schedule 125 input from the outside via the communication interface 113 or the operation input unit 114, and store them in the storage unit 120.

The face image acquisition unit 132 is configured to receive image data of a person to be collated, captured by the camera unit 141 and input via the interface 111, and acquire (detect) a face image of the person to be collated from the image data. The face image acquisition unit 132 performs matching between a template representing a general face contour of a person and image data to thereby acquire a face image existing in the image data. Besides template matching, various publicly-known face detection algorithms may be used. The face image acquisition unit 132 is configured to transmit the acquired face image to the collation unit 133.

The collation unit 133 is configured to read the reference face image data 122 and the collation threshold 123 from the storage unit 120, calculates, for each user ID, similarity between the reference face image included in the reference face image data 122 and a face image acquired by the face image acquisition unit 132, and based on the result of comparing the calculated similarity for each user ID with the collation threshold 123, determine whether or not the face image of the collation target matches a reference face image of any user ID included in the reference face image data 152. As an example of similarity, a cross-correlation coefficient between face images may be used. In that case, the similarity is lowered when a face portion of the same person is included in the two face images. As similarity between face images, besides the cross-correlation coefficient, publicly-known similarity calculation technique may be used. For example, the collation unit 133 may be configured to extract a feature amount from the face image of the collation target, collate the feature amount of the face extracted from the face image with the feature amount of the reference face included in the reference face image data 122, and calculate the similarity between the reference face image and the face image to be collated.

The collation unit 133 is also configured to generate an authentication result representing face authentication failure when there is no reference face image of a user ID in which the similarity with the face image of the collation target acquired by the face image acquisition unit 132 is equal to or larger than the collation threshold 123. The collation unit 133 is also configured to, when there is at least one reference face image in which the similarity with the face image of the collation target acquired by the face image acquisition unit 132 is equal to or larger than the collation threshold 123, generate an authentication result representing face authentication success including the user ID of the maximum similarity. The collation unit 133 is also configured to transmit the authentication result to the output unit 136.

The time measurement unit 134 is configured to measure the elapsed time from the start of operation of the face authentication apparatus 100 and store it as the elapsed time 124 in the storage unit 120. For example, the time measurement unit 134 is configured to measure the elapsed time from the point of time when a command instructing to start operation is input from the operation input unit 114 as the elapsed time from the start of operation of the face authentication apparatus 100. Alternatively, the time measurement unit 134 may be configured to measure the time obtained by subtracting the time during which the gate apparatus 142 is closed or released from the elapsed time, as the elapsed time from the start of operation of the face authentication apparatus 100. Here, "closed" means a state where the gate apparatus 142 is physically blocked to prevent a user from passing through. Further, "released" means a state where a user can freely pass through the gate apparatus 142 without face authentication. A minimum unit of the elapsed time may be a minute, an hour, or a day. Note that in the case where the gate apparatus 142 is a portable type that can be moved, when it is moved to another place and if it is operated first time at that place, the operating time at the previous place may be canceled.

The threshold change unit 135 is configured to read the elapsed time 124 and the threshold changing schedule 125 from the storage unit 120, and based on them, set and change the collation threshold 123. Specifically, at the time of starting operation of the face authentication apparatus 100, the threshold change unit 135 sets a smaller value, relative to the target value, to the collation threshold 123. After the start of operation of the face authentication apparatus 100, the threshold change unit 135 automatically changes the collation threshold 123 to a larger value gradually until it reaches the target value. The threshold change unit 135 also changes the collation threshold 123 in accordance with a request from a user. At that time, before changing the value of the collation threshold 123 in accordance with the request from the user, the threshold change unit 135 checks whether or not the value of the collation threshold after the change becomes larger than a value that is determined depending on the elapsed time from the start of operation of the face authentication apparatus 100, and if it is larger, rejects the request.

The output unit 136 is configured to transmit an authentication result of the collation unit 133 to the gate apparatus 142 via the interface 112. The output unit 136 may be configured to display the authentication result of the collation unit 133 on the screen display unit 115, and/or transmit it to an external device via the communication interface 113.

Figure 4:
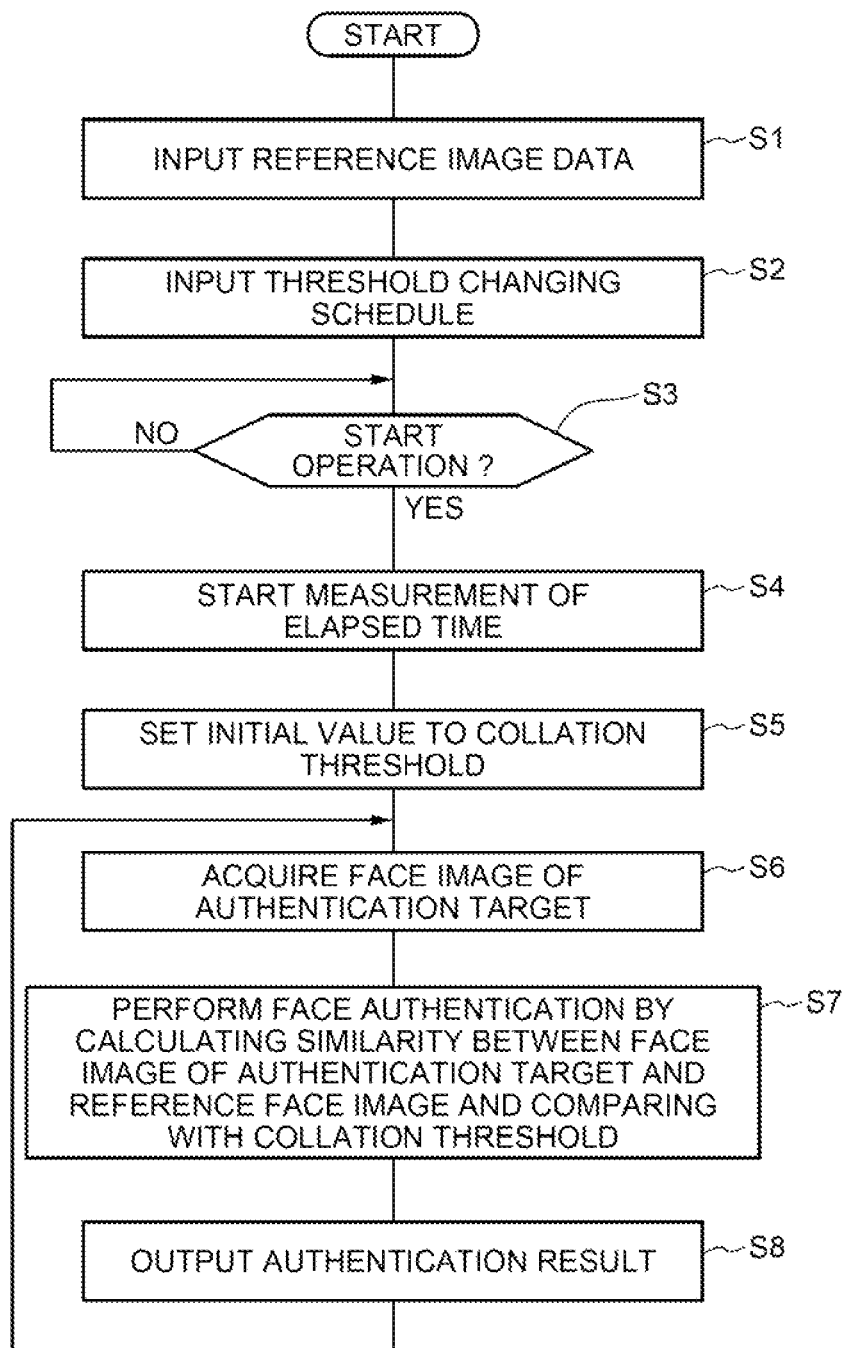
FIG. 4 is a flowchart illustrating the overall operation of the face authentication apparatus according to the first exemplary embodiment of the present invention.

FIG. 4 is a flowchart illustrating the overall operation of the face authentication apparatus 100. Referring to FIG. 4, first, the input unit 131 of the face authentication apparatus 100 receives the reference face image data 122 input from the outside, and stores it in the storage unit 120 (step S1). Then, the input unit 131 receives the threshold changing rule 125 input from the outside, and stores it in the storage unit 120 (step S2). Then, the time measurement unit 134 of the face authentication apparatus 100 waits for an input of a command instructing the operation start from the operator via the operation input unit 114 (step S3). Then, when a command instructing the operation start is input, the time measurement unit 134 stores the elapsed time 124 having a value 0 in the storage unit 120, and starts measurement of the elapsed time (step S4). Then, the time measurement unit 134 stores the collation threshold 123 having the initial value in the storage unit 120 (step S5). That is, since the value of the elapsed time 124 is 0, the time measurement unit 134 sets, to the collation threshold 123, the value TH1 of the collation threshold of the stage of the stage No. 1 in the threshold changing schedule 125 illustrated in FIG. 3. The processing of steps S1 to S5 described above is performed only once when operation of the face authentication apparatus 100 is started. Note that after the start of operation of the face authentication apparatus 100, it is possible to add new reference face image data 122 to the reference face image data 122 stored in the storage unit 120 or delete part of the stored reference face image data 122.

During operation, the face authentication apparatus 100 operates as described below. First, the face image acquisition unit 132 of the face authentication apparatus 100 receives image data obtained by capturing a collation target, input from the camera unit 141, and acquires the face image of the collation target from the image data (step S6). Then, the collation unit 133 of the face authentication apparatus 100 calculates similarity between each reference face image included in the reference face image data 122 and the face image of the collation target acquired by the face image acquisition unit 132 and compares the similarity with the collation threshold 123 to thereby perform face authentication (step S7).

Next, the output unit 136 of the face authentication apparatus 100 outputs the result of face authentication to the gate apparatus 142 via the interface 112 (step S8). Then, the face authentication apparatus 100 returns to step S6 and repeats the same processes as those described above.

Figure 5:
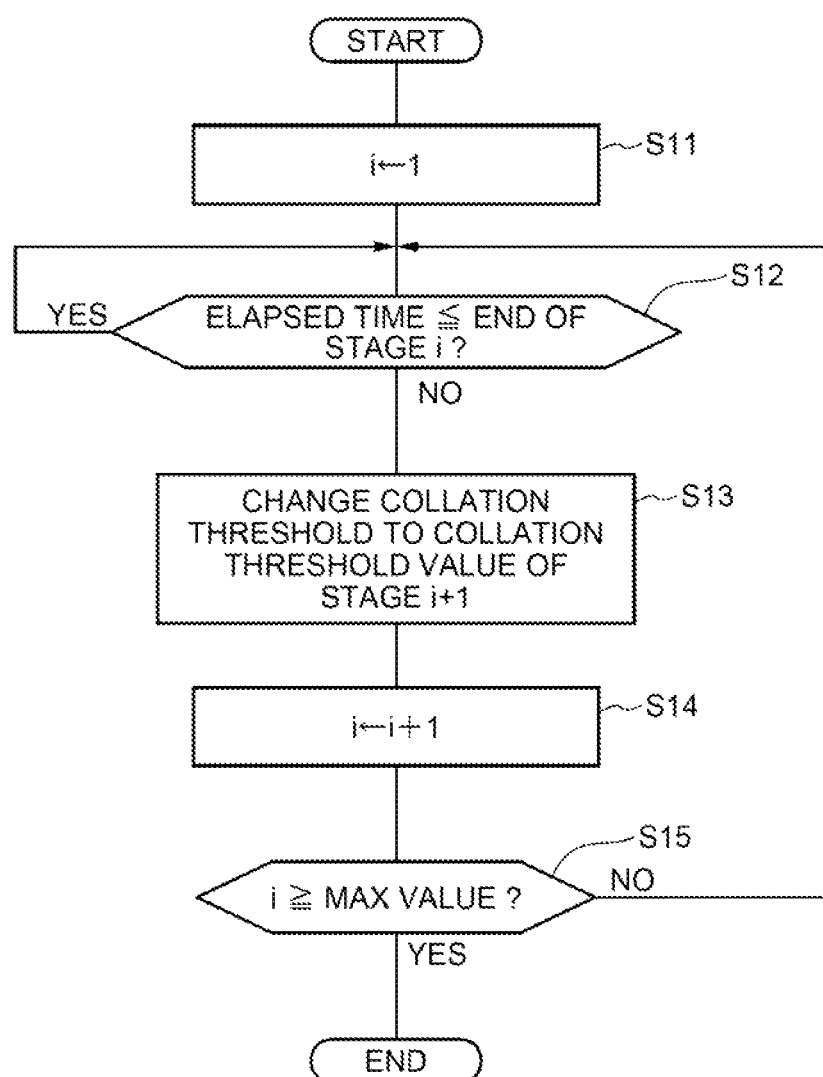
FIG. 5 is a flowchart illustrating an exemplary operation of a threshold change unit in the face authentication apparatus according to the first exemplary embodiment of the present invention.

The face authentication apparatus 100 is also configured to perform processing illustrated in FIG. 5 parallel to the processing illustrated in FIG. 4. Referring to FIG. 5, the threshold change unit 135 of the face authentication apparatus 100 initializes the noticed stage No. i to 1 (step S11), and monitors that the elapsed time 124 stored in the storage unit 120 exceeds the end of the stage No. i, that is, the end T1 of the stage No. 1 (step S12). Then, when the elapsed time 124 exceeds T1, the threshold change unit 135 changes the collation threshold 123 stored in the storage unit 120 to the value of the collation threshold used in the stage of the stage No. i+1, that is, TH2. Then, the threshold change unit 135 increments the stage No. i to 2, and determines whether or not the stage number i is equal to or larger than the maximum value (in the case of the threshold changing schedule of FIG. 3, the maximum value is 4) (step S15). Then, if the stage number i does not exceed the maximum value, the threshold change unit 135 returns to step S12 and repeats the same processes as those described above. Thereby, whether or not the elapsed time 124 exceeds the end T2 of the stage number 2 is monitored, and at the point of time when it is exceeded, the collation threshold 123 is changed to TH3. Similarly, when the elapsed time 124 exceeds the end T3 of the stage No. 3, the collation threshold 123 is changed to TH4. Then, when the internal variable i becomes the maximum value or larger, the threshold change unit 135 ends the processing of FIG. 5.

Since the threshold change unit 135 performs the processing illustrated in FIG. 5 as described above, the collation threshold 123 that is initially set to have the value TH1 in the storage unit 120 is automatically changed from TH1 to TH2 when the elapsed time from the start of operation exceeds T1. Also, when the elapsed time from the start of operation exceeds T2, the collation threshold is automatically changed from TH2 to TH3. Then, when the elapsed time from the start of operation exceeds T3, the collation threshold is automatically changed from TH3 to TH4 that is the target value. In this way, the threshold change unit 135 changes the collation threshold 123 to a larger value gradually until it reaches the target value.

Figure 6:
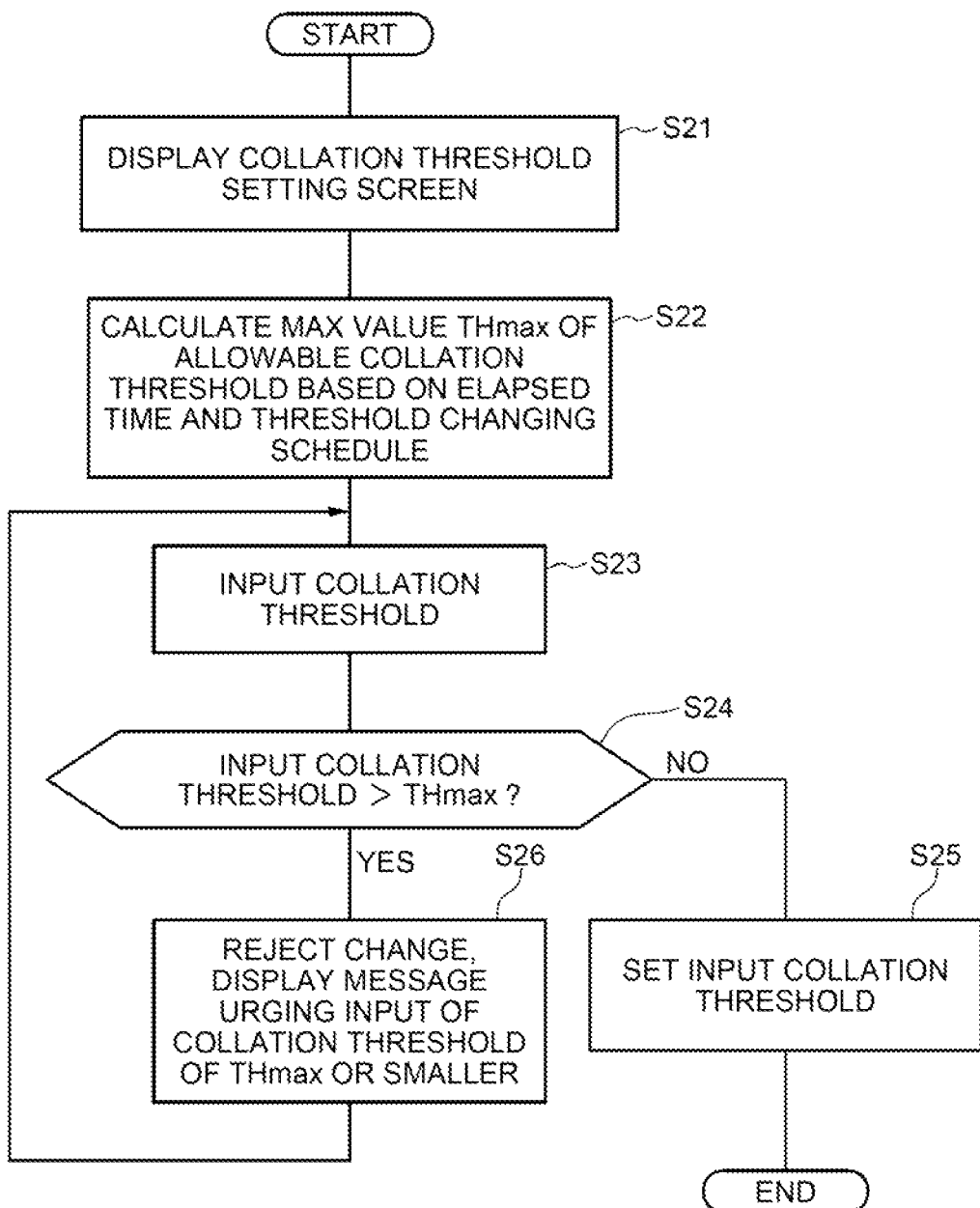
FIG. 6 is a flowchart illustrating another exemplary operation of the threshold change unit in the face authentication apparatus according to the first exemplary embodiment of the present invention.

The face authentication apparatus 100 is also configured to perform processing illustrated in FIG. 6 parallel to the processing illustrated in FIGS. 4 and 5. The face authentication apparatus 100 starts processing illustrated in FIG. 6 when, for example, a command requesting a change of a collation threshold is input from the operator via the operation input unit 114.

Figure 7:
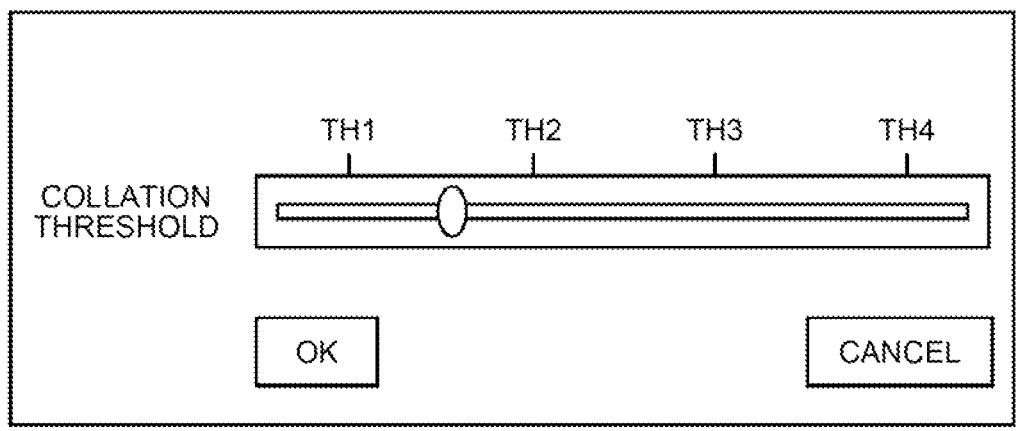
FIG. 7 illustrates an example of a collation threshold setting screen displayed by the threshold change unit in the face authentication apparatus according to the first exemplary embodiment of the present invention.

Referring to FIG. 6, the threshold change unit 135 of the face authentication apparatus 100 first displays a collation threshold setting screen on the screen display unit 115 (step S21). FIG. 7 illustrates an example of a collation threshold setting screen. The collation threshold setting screen of this example includes a slide bar for designating the value of a collation threshold, an OK button, and a cancel button.

Then, the threshold change unit 135 calculates an allowable maximum value THmax of the collation threshold on the basis of the elapsed time 124 and the threshold changing schedule 125 stored in the storage unit 120 (step S22). That is, in the stage where the elapsed time from the start of operation does not exceed T1 (stage No. 1), the allowable maximum value THmax of the collation threshold is TH1. In the stage where the elapsed time from the start of operation does not exceed T2 (stage No. 2), the maximum value THmax is TH2. In the stage where the elapsed time from the start of operation does not exceed T3 (stage No. 3), the maximum value THmax is TH3. Meanwhile, in the stage where the elapsed time from the start of operation exceeds T3 (stage No. 4), the maximum value THmax is TH4 or TH4+α. Here, α is a predetermined value.

Next, the threshold change unit 135 receives a collation threshold input from the user (step S23). In the collation threshold setting screen of FIG. 7, the user designates the collation threshold by moving the position of the knob of the slide bar to left or right. Then, when the OK button is clicked, the threshold change unit 135 executes processing of steps S24 and after of FIG. 6. When the cancel button is clicked, the processing of FIG. 6 ends.

At step S24, the threshold change unit 135 determines whether or not the value of the input collation threshold is larger than the maximum value THmax calculated at step S22. When the value of the input collation threshold is not larger than the maximum value THmax, the threshold change unit 135 changes the collation threshold 123 stored in the storage unit 120 to the value of the input collation threshold (step S25). Then, the threshold change unit 135 ends the processing of FIG. 6.

On the other hand, when the value of the input collation threshold is larger than the maximum value THmax, the threshold change unit 135 rejects the change, and displays a message urging input of a collation threshold equal to or smaller than THmax on the screen display unit 115 (step S26). Then, the threshold change unit 135 returns to step S23 and receives input of a collation threshold again.

Since the threshold change unit 135 performs the processing as illustrated in FIG. 6, it is possible to prevent a situation in which a user easily changes the collation threshold 123 to a large value in the beginning of the operation so that failure in face authentication frequently occurs.

As described above, according to the present embodiment, the threshold change unit 135 is configured to set the collation threshold 123 to be smaller relative to the target value at the time of starting operation of the face authentication apparatus 100, and prohibit a change of the collation threshold to a value larger than a value that is determined depending on the elapsed time from the start of the operation. Therefore, it is possible to prevent deterioration in the convenience of the face authentication apparatus 100 in the beginning of the operation.

Further, according to the present embodiment, the threshold change unit 135 is configured to automatically change the collation threshold 123 to a larger value gradually according to the elapsed time from the start of operation of the face authentication apparatus 100. Therefore, it is possible to finally set the collation threshold to the target value without impairing the convenience of the face authentication apparatus 100 and without placing a load on the administrator.

Second Exemplary Embodiment

Next, a second exemplary embodiment of the present invention will be described. A face authentication apparatus 200 of the present embodiment differs from that of the first exemplary embodiment in that the face authentication apparatus 200 includes a plurality of types of threshold changing schedules 125.

FIG. 8 shows an example of a plurality of types of threshold changing schedules 125. Each of the threshold changing schedules is configured of a row describing schedule No., a row describing a selection condition, and rows each describing a set of stage No, period, and a collation threshold value. In the three threshold changing schedules illustrated in FIG. 8, the initial values and the target values of the collation thresholds are the same, but the intermediate values and the numbers thereof are different from each other. That is, a threshold changing schedule 125-1 of schedule No. 1 is the same as the threshold changing schedule 125 illustrated in FIG. 3. The collation threshold is changed from the initial value TH1 to the target value TH4 via the two intermediate values TH2 and TH3, and the elapsed time up to the target value TH4 is T3. In a threshold changing schedule 125-2 of schedule No. 2, the collation threshold is changed from the initial value TH1 to the target value TH4 via an intermediate value (TH2+TH3)/2, and the elapsed time up to the target value TH4 is T2 that is shorter than T3. In a threshold changing schedule 125-3 of schedule No. 3, the collation threshold is changed from the initial value TH1 to the target value TH4 via five intermediate values (TH1+TH2)/2, TH2, (TH2+TH3)/2, TH3, and (TH3/TH4)/2, and the elapsed time up to the target value TH4 is T4 that is longer than T3. In short, in the threshold changing schedule 125-2, the collation threshold reaches the target value in a shorter period, and the changing width per change is larger. On the other hand, in the threshold changing schedule 125-3, the collation threshold reaches the target value with a longer period, and the changing width per change is smaller. The threshold changing schedule 125-1 has an intermediate characteristic between the threshold changing schedule 125-2 and the threshold changing schedule 125-3.

In the present embodiment, the threshold change unit 135 is configured to select a threshold changing schedule to be used from a plurality of types of threshold changing schedules 125, based on the history of similarity on face authentication success. Specifically, as an index of selecting a threshold changing schedule, the threshold change unit 135 uses an average value of the similarity when authentication performed by the collation unit 133 succeeded during the period from the point of starting operation until time T1 elapsed. The threshold change unit 135 is configured to select a threshold changing schedule that is scheduled to reach the target value TH4 in a shorter period as the average value of the similarity on face authentication success is larger. For example, when the average value of the similarity on face authentication success is equal to or smaller than a value A set in advance, the threshold change unit 135 selects the threshold changing schedule 125-3. When the average value of the similarity on face authentication success is larger than the value A and equal to or smaller than a value B set in advance, the threshold change unit 135 selects the threshold changing schedule 125-1. Here, B>A is established. When the average value of the similarity on face authentication success is larger than the value B, the threshold change unit 135 selects the threshold changing schedule 125-2. However, the index for selecting a threshold changing schedule is not limited to those described above. For example, it may be a minimum value, a maximum value, or a median value of the similarity on face authentication success during the period from the point of starting operation until time T1 elapsed. Alternatively, it is possible to divide a period from the point of starting operation until time T1 elapsed into a plurality of sections, and an inclination of a line segment linking average values of the similarity on face authentication success in the respective sections may be used as an index.

Next, operation of the face authentication apparatus 200 according to the present embodiment will be described by focusing on the differences from the operation of the face authentication apparatus 100 according to the first exemplary embodiment.

First, at step S5 of FIG. 4, the threshold change unit 135 selects the threshold changing schedule 125-3 as a threshold changing schedule to be actually used, from among the three threshold changing schedules 125 illustrated in FIG. 8. This is because the threshold changing schedule 125-3, among the three threshold changing schedules, gently increments the collation threshold from the initial value TH1 taking the longest time, so that it has the smallest possibility of impairing the convenience.

When the face authentication succeeded at step S7 of FIG. 4, the threshold change unit 135 acquires the similarity on face authentication success from the collation unit 133, and stores it as a history. Then, the threshold change unit 135 calculates an average value of the accumulated similarity on the face authentication success in a period from the point of starting operation until immediately before time T1 elapses, and compares it with the value A and the value B. Then, when the average value of the similarity on face authentication success is equal to or smaller than the value A, the threshold change unit 135 maintains the state of selecting the threshold changing schedule 125-3. When the average value of the similarity on face authentication success is larger than the value A and equal to or smaller than the value B, the threshold change unit 135 selects the threshold changing schedule 125-1 in place of the threshold changing schedule 125-3. When the average value of the similarity on face authentication success is larger than the value B, the threshold change unit 135 selects the threshold changing schedule 125-2 in place of the threshold changing schedule 125-3. Then, the threshold change unit 135 performs the processing illustrated in FIGS. 5 and 6 on the basis of the selected threshold changing schedule.

In the present embodiment, the threshold change unit 135 selects and uses a threshold changing schedule suitable for the actual operating environment from a plurality of types of threshold changing schedules, based on the history of the similarity on face authentication success. As described above, by using the threshold changing schedule suitable for the actual operation environment, it is possible to further prevent deterioration in convenience of the face authentication apparatus in the beginning of the operation, and to set the collation threshold to a target value in a shorter period of time.

Third Exemplary Embodiment

Figure 9:
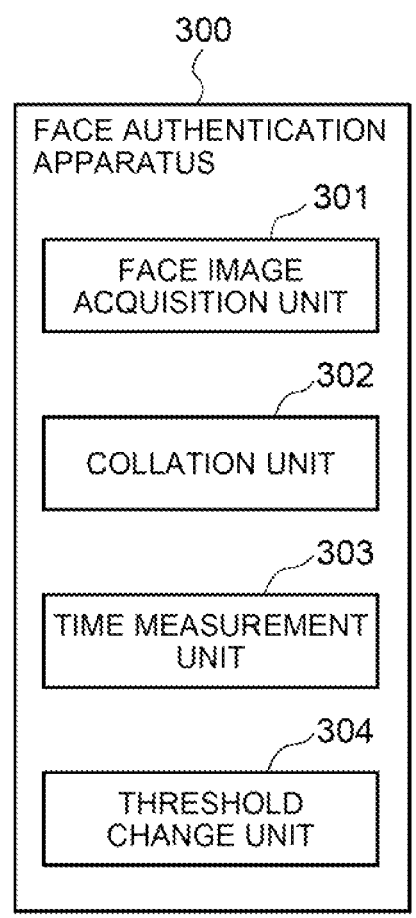
FIG. 9 is a block diagram of a face authentication apparatus according to a third exemplary embodiment of the present invention.

Next, a third exemplary embodiment of the present invention will be described. FIG. 9 is a block diagram of a face authentication apparatus 300 according to the present embodiment. Referring to FIG. 9, the face authentication apparatus 300 of the present embodiment includes a face image acquisition unit 301, a collation unit 302, a time measurement unit 303, and a threshold change unit 304.

The face image acquisition unit 301 is configured to acquire a face image of an authentication target with use of a camera or the like. The face image acquisition unit 301 may have a configuration similar to that of the face image acquisition unit 132 of FIG. 1, but it is not limited thereto. The collation unit 302 is configured to perform face authentication on the face image of the authentication target on the basis of a threshold. The collation unit 302 may have a configuration similar to that of the collation unit 133 of FIG. 1, but it is not limited thereto. The time measurement unit 303 is configured to measure the elapsed time from the start of operation of the face authentication apparatus 300. The time measurement unit 303 may have a configuration similar to that of the time measurement unit 134 of FIG. 1, but it is not limited thereto. The threshold change unit 304 is configured to restrict changing of the threshold to a value larger than a value that is determined depending on the measured elapsed time. The threshold change unit 304 may have a configuration similar to that of the threshold change unit 135 of FIG. 1, but it is not limited thereto.

The face authentication apparatus 300 according to the present embodiment configured as described above operates as described below. First, the face image acquisition unit 301 acquires a face image of an authentication target. Then, the collation unit 302 performs face authentication on the face image of the authentication target on the basis of a threshold. The time measurement unit 303 measures the elapsed time from the start of operation of the face authentication apparatus 300. Then, the threshold change unit 304 restricts changing of the threshold to a value larger than a value that is determined depending on the measured elapsed time.

As described above, according to the present embodiment, it is possible to prevent deterioration in convenience of the face authentication apparatus in the beginning of the operation. This is because the threshold change unit 304 restricts changing of the threshold to a value larger than a value that is determined depending on the measured elapsed time.

While the present invention has been described with reference to the exemplary embodiments described above, the present invention is not limited to the above-described embodiments. The form and details of the present invention can be changed within the scope of the present invention in various manners that can be understood by those skilled in the art.

For example, in the second exemplary embodiment, a threshold changing schedule suitable for the actual operating environment is selected from a plurality of types of threshold changing schedules, based on the history of the similarity on face authentication success. However, the period of the threshold changing schedule may be changed based on the history of the similarity on face authentication success. For example, in the case of using the threshold changing schedule illustrated in FIG. 3, if the average value of the similarity on face authentication success in a period from the start of operation until time T1 elapsed is smaller than the predetermined value A, the period of the stage is extended. That is, T1 is changed to T1+Δt, T2 is changed to T2+2Δt, and T3 is changed to T3+3Δt, for example. Here, Δt represents a period of time having a predetermined length. Further, if the average value of the similarity on face authentication success is equal to or larger than the predetermined value B (>A), the period of the stage is shortened. That is, T2 is changed to T2−2Δt, and T3 is changed to T3−2Δt, for example.

Further, the collation threshold may be set for each user ID. In that case, the collation threshold for each user ID may be changed with use of a threshold changing schedule common to the user IDs. Alternatively, it is possible to use a threshold changing schedule for each user ID and change the collation threshold for each user ID in accordance with the corresponding threshold changing schedule. Moreover, if the passage rate of the gate is lowered due to a change in the collation threshold, flexible operation such as temporarily decrementing the collation threshold may be adopted.

INDUSTRIAL APPLICABILITY

The present invention is applicable to an access monitoring system, an attendance management system, and the like, and in particular, suitable for the case of improving convenience and security by automatically correcting the threshold used for collation appropriately without placing a burden on the users.

The whole or part of the exemplary embodiments disclosed above can be described as, but not limited to, the following supplementary notes.

(Supplementary Note 1)

A face authentication apparatus comprising:

a face image acquisition unit that acquires a face image of an authentication target;

a collation unit that performs face authentication on the face image of the authentication target on a basis of a threshold;

a time measurement unit that measures elapsed time from a time of starting operation of the face authentication apparatus; and a threshold change unit that restricts changing of the threshold to a value larger than a value determined depending on the elapsed time measured.

(Supplementary Note 2)

The face authentication apparatus according to supplementary note 1, wherein the threshold change unit sets the threshold to be smaller relative to a target value at the time of starting the operation of the face authentication apparatus.

(Supplementary Note 3)

The face authentication apparatus according to supplementary note 1 or 2, wherein before changing the threshold in accordance with a request from a user, the threshold change unit checks whether or not a value of the threshold after the change is larger than the value determined depending on the elapsed time measured, and if the value is larger, the threshold change unit rejects the request.

(Supplementary Note 4)

The face authentication apparatus according to any of supplementary notes 1 to 3, wherein the threshold change unit gradually increments the threshold until the threshold reaches a target value in accordance with the value determined depending on the elapsed time measured.

(Supplementary Note 5)

The face authentication apparatus according to any of supplementary notes 1 to 4, further comprising a threshold changing schedule that is a schedule of changing the threshold after the time of starting the operation of the face authentication apparatus and in which a value of the threshold after the change becomes larger as the elapsed time from the time of starting the operation is longer, wherein the threshold change unit calculates the value determined depending on the elapsed time measured, on a basis of the threshold changing schedule and the elapsed time measured.

(Supplementary Note 6)

The face authentication apparatus according to supplementary note 5, further comprising a plurality of types of the threshold changing schedules, wherein the threshold change unit selects, from the plurality of the types of the threshold changing schedules, a threshold changing schedule to be used for calculating the value determined depending on the elapsed time measured, on a basis of a history of face authentication success.

(Supplementary Note 7)

The face authentication apparatus according to any of supplementary notes 1 to 6, further comprising an output unit that outputs a result of the face authentication.

(Supplementary Note 8)

The face authentication apparatus according to supplementary note 7, wherein the face image acquisition unit acquires a face image of a user who passes through a gate apparatus as the face image of the authentication target, and the output unit outputs, to the gate apparatus, a result of the face authentication for controlling open and close operation of the gate apparatus.

(Supplementary Note 9)

The face authentication apparatus according to any of supplementary notes 1 to 8, wherein in the face authentication, a feature amount of a face extracted from the face image of the authentication target and a feature amount of a face extracted from a reference face image of each registered user are collated with each other, and similarly between the face image of the authentication target and the reference face image is calculated.

(Supplementary Note 10)

A face authentication method performed by a face authentication apparatus, the method comprising:

acquiring a face image of an authentication target;

performing face authentication on the face image of the authentication target on a basis of a threshold;

measuring elapsed time from a time of starting operation of the face authentication apparatus; and restricting changing of the threshold to a value larger than a value determined depending on the elapsed time measured.

(Supplementary Note 11)

The face authentication method according to supplementary note 10, wherein the threshold is set to be smaller relative to a target value at the time of starting the operation of the face authentication apparatus.

(Supplementary Note 12)

The face authentication method according to supplementary note 10 or 11, wherein the restricting the changing of the threshold includes, before changing the threshold in accordance with a request from a user, checking whether or not a value of the threshold after the change is larger than the value determined depending on the elapsed time measured, and if the value is larger, rejecting the request.

(Supplementary Note 13)

The face authentication method according to any of supplementary notes 10 to 12, further comprising gradually incrementing the threshold until the threshold reaches a target value in accordance with the value determined depending on the elapsed time measured.

(Supplementary Note 14)

The face authentication method according to any of supplementary notes 10 to 13, wherein the face authentication apparatus includes a threshold changing schedule that is a schedule of changing the threshold after the time of starting the operation of the face authentication apparatus and in which a value of the threshold after the change becomes larger as the elapsed time from the time of starting the operation is longer, and the method further comprises calculating the value determined depending on the elapsed time measured, on a basis of the threshold changing schedule and the elapsed time measured.

(Supplementary Note 15)

The face authentication method according to supplementary note 14, wherein the face authentication apparatus includes a plurality of types of the threshold changing schedules, and the method further comprises selecting, from the plurality of the types of the threshold changing schedules, a threshold changing schedule to be used for calculating the value determined depending on the elapsed time measured, on a basis of a history of face authentication success.

(Supplementary Note 16)

The face authentication method according to any of supplementary notes 10 to 15, further comprising outputting a result of the face authentication.

(Supplementary Note 17)

The face authentication method according to supplementary note 16, wherein the acquiring the face image includes acquiring a face image of a user who passes through a gate apparatus as the face image of the authentication target, and the outputting the result of the face authentication includes outputting, to the gate apparatus, a result of the face authentication for controlling open and close operation of the gate apparatus.

(Supplementary Note 18)

The face authentication method according to any of supplementary notes 10 to 17, wherein in the face authentication, a feature amount of a face extracted from the face image of the authentication target and a feature amount of a face extracted from a reference face image of each registered user are collated with each other, and similarly between the face image of the authentication target and the reference face image is calculated.

(Supplementary Note 19)

A computer-readable medium storing a program for causing a computer constituting a face authentication apparatus to function as:

a face image acquisition unit that acquires a face image of an authentication target;

a collation unit that performs face authentication on the face image of the authentication target on a basis of a threshold;

a time measurement unit that measures elapsed time from a time of starting operation of the face authentication apparatus; and a threshold change unit that operates to change the threshold to a value larger than a value determined depending on the elapsed time measured.

(Supplementary Note 20)

The face authentication apparatus, the face authentication method, or the computer-readable medium storing the program according to any of supplementary notes 1 to 19, wherein the threshold change unit gradually increments the threshold until the threshold reaches a target value in accordance with the elapsed time measured and a history of the similarity when the face authentication succeeded.

(Supplementary Note 21)

The face authentication apparatus, the face authentication method, or the computer-readable medium storing the program, according to any of supplementary notes 1 to 20, wherein the threshold change unit changes the period of the threshold changing schedule on the basis of a history of the similarity when the face authentication succeeded.

REFERENCE SIGNS LIST 100 face authentication apparatus
111 interface
112 interface
113 communication interface
114 operation input unit
115 screen display unit
120 storage unit
121 program
122 reference face image data
123 collation threshold
124 elapsed time
125 threshold changing schedule
130 arithmetic processing unit
131 input unit
132 face image acquisition unit
133 collation unit
134 time measurement unit
135 threshold change unit
136 output unit
141 camera unit
142 gate apparatus
143 user
200 face authentication apparatus
300 face authentication apparatus
301 face image acquisition unit
302 collation unit
303 time measurement unit
304 threshold change unit

The invention claimed is:

1. A biometric authentication apparatus comprising:
a memory containing program instructions; and
a processor coupled to the memory, wherein the processor is configured to execute the program instructions to:
acquire biological information of a person who passes through a gate apparatus;
perform biometric authentication on the biological information on a basis of a threshold;
measure elapsed time from a time of starting operation of the gate apparatus; and
receive a request for changing the threshold from a user, and restrict changing of the threshold to a value larger than a value determined depending on the measured elapsed time.

2. The biometric authentication apparatus according to claim 1, wherein
the gate apparatus is a movable portable-type gate apparatus.

3. The biometric authentication apparatus according to claim 1, wherein the processor is further configured to execute the instructions to:
subtract a time during which the gate apparatus is closed or released, from the measured elapsed time.

4. The biometric authentication apparatus according to claim 1, wherein
the processor is further configured to execute the instructions to:
calculate the value determined depending on the elapsed time measured, on a basis of a threshold changing schedule and the measured elapsed time, and
in the threshold changing schedule, a value of the threshold after the change is larger as the elapsed time from the time of starting the operation of the gate apparatus is longer.

5. The biometric authentication apparatus according to claim 1, wherein
the processor is further configured to execute the instructions to:
select, from a plurality of types of threshold changing schedules, a threshold changing schedule on a basis of a history of biometric authentication success, and calculate the value determined depending on the measured elapsed time, on a basis of the selected threshold changing schedule and the measured elapsed time,
wherein in each type of threshold changing schedule, a value of the threshold after the change is larger as the elapsed time from the time of starting the operation of the gate apparatus is longer.

6. The biometric authentication apparatus according to claim 1, wherein the processor is further configured to execute the instructions to:
output a result of the biometric authentication.

7. The biometric authentication apparatus according to claim 6, wherein the processor is further configured to execute the instructions to:
in the outputting, output the result of the biometric authentication to the gate apparatus in order to control open and close operation of the gate apparatus.

8. The biometric authentication apparatus according to claim 1, wherein the processor is further configured to execute the instructions to:
in the biometric authentication, collate a feature amount of a living body extracted from the biological information of an authentication target with a feature amount of a living body extracted from reference biological information of each of a plurality of registered users, and calculate similarly between the biological information of the authentication target and the reference biological information.

9. A biometric authentication method comprising:
acquiring, by a processor, biological information of a person who passes through a gate apparatus;
performing, by the processor, biometric authentication on the biological information on a basis of a threshold;
measuring, by the processor, elapsed time from a time of starting operation of the gate apparatus;
receiving, by the processor, a request for changing the threshold from a user; and
restricting, by the processor, changing of the threshold to a value larger than a value determined depending on the measured elapsed time.

10. The biometric authentication method according to claim 9, wherein
the gate apparatus is a movable portable-type gate apparatus.

11. The biometric authentication method according to claim 9, further comprising:
subtracting, by the processor, a time during which the gate apparatus is closed or released, from the measured elapsed time.

12. The biometric authentication method according to claim 9, further comprising:
calculating, by the processor, the value determined depending on the elapsed time measured, on a basis of a threshold changing schedule in which a value of the threshold after the change is larger as the elapsed time from the time of starting the operation of the gate apparatus is longer, and the measured elapsed time.

13. The biometric authentication method according to claim 9, further comprising:
selecting, by the processor and from a plurality of types of threshold changing schedules in which a value of the threshold after the change is larger as the elapsed time from the time of starting the operation of the gate apparatus is longer, a threshold changing schedule on a basis of a history of biometric authentication success; and
calculating the value determined depending on the measured elapsed time, on a basis of the selected threshold changing schedule and the measured elapsed time.

14. The biometric authentication method according to claim 9, further comprising:
outputting, by the processor, a result of the biometric authentication.

15. The biometric authentication method according to claim 9, further comprising:
outputting, by the processor, a result of the biometric authentication to the gate apparatus in order to control open and close operation of the gate apparatus.

16. The biometric authentication method according to claim 9, further comprising:
in the biometric authentication, collating, by the processor, a feature amount of a living body extracted from the biological information of an authentication target with a feature amount of a living body extracted from reference biological information of each of a plurality of registered users; and
calculating, by the processor, similarly between the biological information of the authentication target and the reference biological information.

17. A non-transitory computer-readable medium storing thereon a program comprising instructions for causing a computer to perform processing to:
acquire biological information of a person who passes through a gate apparatus;
perform biometric authentication on the biological information on a basis of a threshold;
measure elapsed time from a time of starting operation of the gate apparatus; and
receive a request for changing the threshold from a user, and restrict changing of the threshold to a value larger than a value determined depending on the measured elapsed time.

18. The non-transitory computer-readable medium according to claim 17, wherein
the gate apparatus is a movable portable-type gate apparatus.

19. The non-transitory computer-readable medium according to claim 17, wherein the program further comprises instructions for causing the computer to perform processing to:
subtract a time during which the gate apparatus is closed or released, from the measured elapsed time.

* * * * *